July 4, 1967 S. G. STEWART 3,328,899
MAP HOLDER
Filed June 1, 1964 2 Sheets-Sheet 1
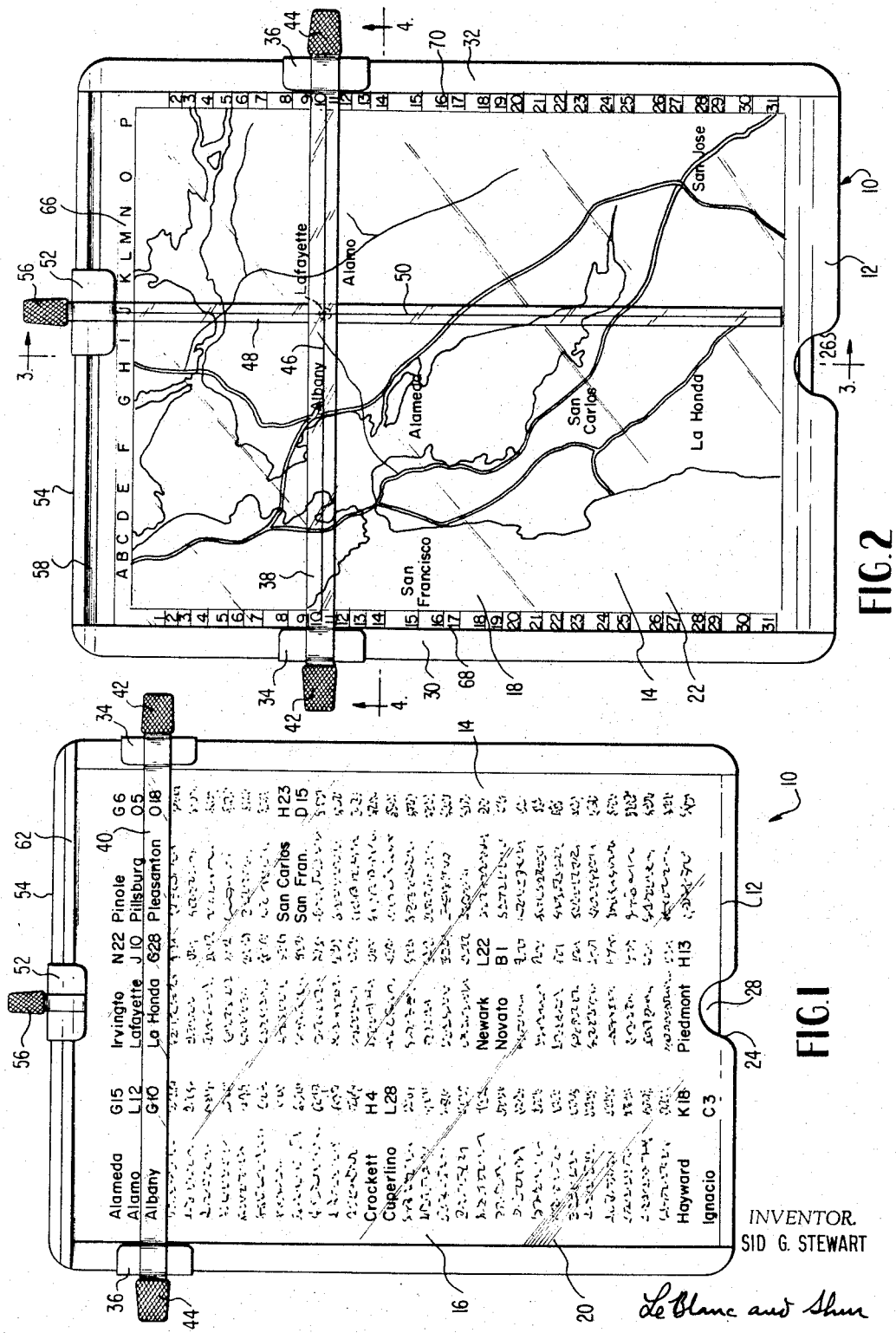
INVENTOR.
SID G. STEWART
LeBlanc and Shur
ATTORNEYS July 4, 1967
S. G. STEWART
3,328,899
MAP HOLDER
Filed June 1, 1964
2 Sheets-Sheet 2
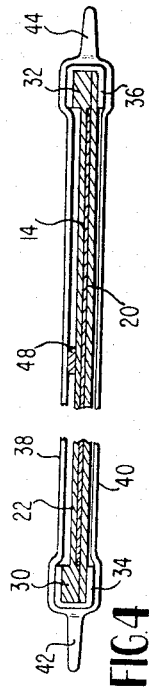
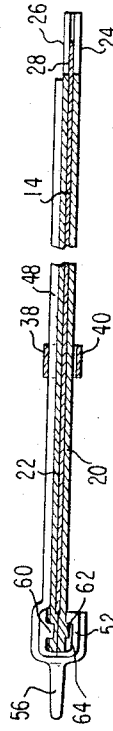
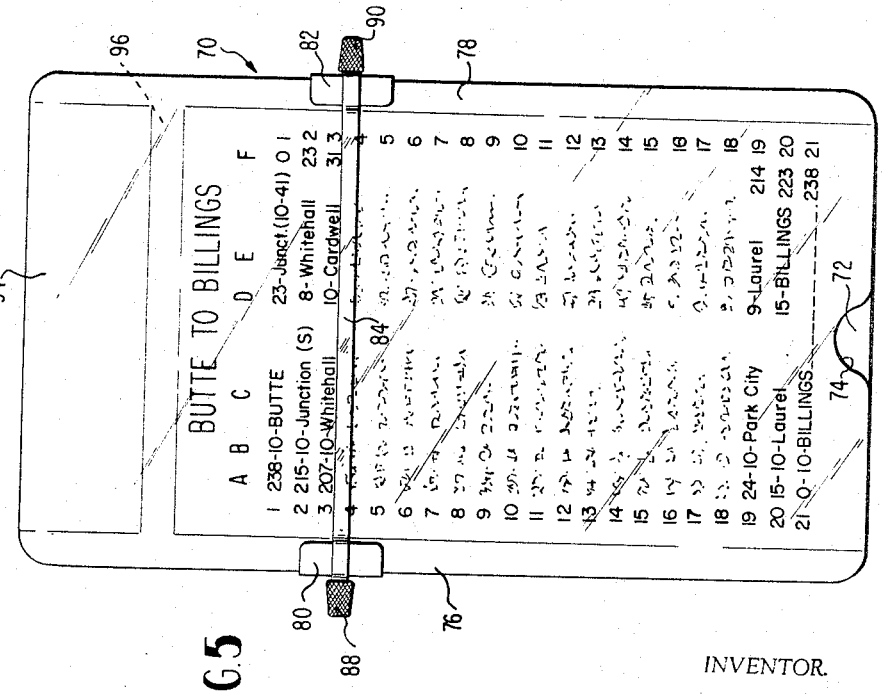
INVENTOR.
SID G. STEWART
BY
LeBlanc and Shur
ATTORNEYS

United States Patent Office 3,328,899
Patented July 4, 1967

3,328,899
MAP HOLDER
Sid G. Stewart, Country Club Road,
Anaconda, Mont. 59711
Filed June 1, 1964, Ser. No. 371,437
5 Claims. (Cl. 35—40)

This invention relates to a device for quickly, accurately, and simply locating any item, place or thing which may be illustrated or shown in a map, chart, illustration, design, plan or other drawing or illustration. In particular, it is directed to a holder or case for maps and other items having one or more transparent indicator bars for indicating the location of a point of travel or information on a map.

Automotive travel has been on the upswing for the past several years as evidenced by the increasing numbers of cars on the roads. This is due partly to the substantial improvement in the roads and highways and the many new turnpikes and bridges that are now making accessible locations that were frequented by very few and is perhaps partly due to the steady exodus into the suburbs of the heretofore urban population which has accompanied the growth of both towns and cities. In short, people are becoming more and more accustomed to traveling greater distances and as a result of this travel more often find themselves in unfamiliar surroundings and in need of guidance to a desired location.

The decision at the fork in the road has become almost outdated with modern highways where even a moment's indecision and a single wrong turn can necessitate several miles of extra travel before the course can be retraced and the proper turn-off taken. For this reason, vacation and business trips are very often carefully planned in advance and several agencies exist whereby the most desired route is planned ahead of time taking into consideration any road construction that may be currently in progress and providing current information as to the most desired highways to be travelled. The need for a simple, inexpensive and reliable road map indicator has existed for many years but has become even more acute with the almost exponential increase in automotive travel. Various map holders, map guides and indicators have been proposed to aid the driver in quickly ascertaining either where he is or the best route to the point of destination. However, these indicators and map holders have not found universal commercial acceptance either due to their cost, their complexity of handling and manipulating, or because they have been relatively fragile and incapable of withstanding extensive use during travel.

To overcome these disadvantages, the present invention provides a relatively simple holder or case for supporting maps or the like of relatively simplified inexpensive construction which makes it possible to quickly and accurately ascertain the desired location and which will withstand extensive use and rugged handling. In the preferred embodiment the device takes the form of a flat, completely transparent case made of suitable unbreakable plastic material having a pocket or compartment into which a map or instruction sheet may be readily inserted and removed as desired. The edges of the case provide tracks for a plurality of slides which support movable transparent indicator bars preferably made of the same transparent plastic material as the case, which bars are movable both horizontally and vertically over the faces of the case and cooperate to indicate the desired location on the map or instruction sheet visible through both the front and back surfaces of the case. The indicator bars are preferably provided with a fine line or indicating strip so that even small points on a map may be quickly located and any information about the location can be quickly ascertained. Hand grips are provided for readily moving the indicator bars to the desired location so that the device may be manipulated by one hand as it rests on a suitable support or on the seat alongside of the driver of an automobile.

In one embodiment constructed in accordance with the present invention the case is adapted to receive a map of a city or other given locality having imprinted on its other surface an index to the streets, towns, points of interest or other locations within the particular area shown on the other face of the map. The locations to be found are preferably listed in alphabetical order and provided with a two coordinate letter and number designation so that when the one bar is moved to the correct letter and the other bar moved to the correct number, the crossed lines on the bars will be positioned at or closely adjacent the desired location. In a second illustrated embodiment of the invention the case is adapted to receive a section of road map having on its other surface information with respect to the towns, mileage, points of interest, along the read or highway shown on the other side of the map. By coordinating the movable transparent bars on opposite sides of the case, it is possible after pin pointing a desired position on the map by simply turning the case over to find desired information with respect to that location, for example, the mileage to the next city or to the ultimate point of destination, as well as any other items of interest which may have been prepared beforehand.

It is, therefore, one object of the present invention to provide a novel device for ascertaining a specific location on a given item.

Another object of the present invention is to provide a novel case for receiving road maps and instruction sheets and the like.

Another object of the present invention is to provide an inexpensive, completely transparent plastic case and indicator for automotive travellers.

Another object of the present invention is to provide a map holder of simplified, inexpensive rugged construction capable of withstanding severe usage to which the device may be occasioned during a long trip.

Another object of the present invention is to provide a flat case made of transparent plastic such as vinyl or the like for receiving road maps and instruction sheets. A plurality of plastic slides cooperate with the edges of the holder to slidably support a plurality of transparent indicator bars movable along two or more edges of the case, which bars cooperate to pinpoint the location of desired information on the map within the case. The case, bars, slides and finger grips for ready manipulation may be all constructed from the same transparent plastic material to give a uniform pleasing appearance and rugged construction.

These and further objects and advantages of the invention will be more apparent upon reference to the following specification, claims and appended drawings wherein FIGURE 1 is a front view of the novel map holder constructed in accordance with the present invention.

FIGURE 2 is a rear view of the device of FIGURE 1.

FIGURE 3 is a cross section taken along line 3—3 of FIGURE 2.

FIGURE 4 is a cross section taken along line 4—4 of FIGURE 2.

FIGURE 5 is a front view of a modified map holder constructed in accordance with the present invention, and FIGURE 6 is a rear view of the map holder of FIGURE 5.

Referring to the drawings, the novel indicator of the present invention generally indicated at 10 in FIGURES 1 and 2 comprise a case 12 having a central pocket adapted to receive a flat sheet of paper 14 which may be printed on its front surface an alphabetical index 16 as illustrated in FIGURE 1 and on its rear surface a corresponding map 18 as illustrated in FIGURE 2. While only a single sheet of material is illustrated, it is apparent that the case may be constructed to receive a plurality of overlying sheets as desired. Extending over the sheet of paper 14 and forming the front surface or face of the case 12 is a rigid sheet or layer of transparent plastic material 20 while the back or map surface 18 of the paper is covered by a similar rigid layer of the same plastic material 22 which may be a vinyl plastic or other completely transparent rigid material. Layers 20 and 22 are joined along three edges in any suitable manner such as by adhesive or by a conventional heat welding process. The layers are spaced to define a central card receiving pocket. The front and back surfaces of the case are provided with notches 24 and 26 exposing the lower edge 28 of the sheet 14 so that it may readily be gripped between the thumb and forefinger for easy insertion into and removal from the case. As best seen in FIGURE 4 the side edges of the plastic layer 22 are thickened as at 30 and 32 to form tracks for the U-shaped slide members 34 and 36. Passing around and secured to these slides are the ends of a pair of transparent indicator bars 38 and 40 with the ends of the bars joined to form knurled flat finger tabs 42 and 44 by means of which the bars may be manipulated between the thumb and forefinger of the operator. The bars are rigidly secured to the slides so that the finger tabs, slides and bars move as a unit along the flanges or tracks 30 and 32 formed along the vertical side edges of the case. The bars may be formed separately and joined at the tabs 42 and 44 or the entire sliding assembly may be formed as a unit and slid over the end of the case onto the flanges 30 and 32. The slides are preferably held rather loosely on the edges so that the entire assembly may be removed from the case by sliding it off the end of the case when desired.

As best seen in FIGURE 2, bar 38 is provided with a pencil thin line or permanent marking 46 and overlies a similar indicator bar 48 having a similar very narrow indicia line 50. Indicator bar 48 is carried by a U-shaped slide 52 movable along one edge 54 of the case also having rigidly secured thereto the flat finger tab 56.

As best seen in FIGURES 2 and 3 the upper edge 54 of layer 22 is provided with a groove 58 adapted to be engaged by the projection 60 formed in the slide 52 while the upper edge of the front layer 20 as illustrated in FIGURE 1 is provided with a corresponding ridge 62 projecting into a corresponding groove 64 in the other arm of the slide so that the corresponding ridges and grooves form a slide track for the slide 52 along the edge 54 of the case. Again, the engagement is relatively loose and the plastic material is sufficiently flexible so that the upper and lower arms of the slide 52 may be sufficiently spread to clear the groove 58 and ridge 62 so that the slide 52 and indicator bar 48 may be completely removed from the case when desired.

In operation a card such as the sheet of paper 14 is inserted between the layers 20 and 22 and in the embodiment illustrated in FIGURE 1 the card carries on its rear surface a map of the San Francisco area and on its front surface an index to this map. Along the top edge of the card on the map surface is provided letter indicia 66 and along each vertical edge is provided the number indicia 68 and 70 which, when combined give the cartesian coordinates of a point located on the map. On the upper edge the series of letters are arranged in alphabetical order and extend across the entire width of the map. Along the left and right edges the numbers are arranged in chronological order extending down the entire length of the map. On the front of the card is an index or inventory of the many towns, cities and points of interest, all shown on the map. After each item in the index is a key letter and number which shows the positions that the vertical and horizontal bars 48 and 38 should be placed in order to find the location of this index place. The point of interesection of the vertical and horizontal bars is the location of the inquiry.

While the device of FIGURES 1 through 4 has been described in connection with ascertaining the location of places on a map, it may be used for many other purposes such as finding the location of merchandise displayed in a store or finding the location or the position of index parts or materials in plans or specification drawings. In other words, the map holder may be used for finding the locations of any part, item, place, or thing in any plan, map, drawing, specification, or illustration.

Referring to FIGURES 5 and 6 there is shown a second embodiment of the present invention in many respects similar to the embodiment already described. In this embodiment the map holder generally indicated at 70 in FIGURES 5 and 6 comprises front and back surfaces of plastic material sufficiently spaced to receive a card 72 with each of the surfaces provided with a notch such as 74 and 76 for ready insertion and removal of the card. The joined side edges 76 and 78 provide tracks for a pair of U-shaped slides 80 and 82 carrying movable transparent bars 84 and 86 and provided with the flat finger tabs 88 and 90. As before, the bar 86 is provided with the fine indicia line 92. The slides, bars and finger tabs, are all formed in the manner of the vertical slides 34 and 36 and associated structure of the previous embodiment. However, since only a single bar moves over each surface neither sheet is provided with a thickened portion corresponding to flanges 30 and 32 of the previous embodiment. Again, the case, slides, bars, and finger tabs are all formed of completely transparent plastic material, such as a vinyl plastic. However, if desired bar 84 may be coated over its outer surface with a readily visible non-transparent coating so as to be more readily visible and easily aligned with the proper row of information. In the alternative it may be provided with a fine indicia line in the manner of bar 86.

A separate pocket 94 is provided at the top of the case 70 for inserting advertising matter or the like so that the interior of the case 70 is divided into two narrow flat compartments or pockets by a solid strip of plastic material illustrated at 96 extending completely across from edge 76 to edge 78.

In the embodiment of FIGURES 5 and 6 the card carries a section of road map, in this instance and by way of illustration only, on the back of the card is a strip map of a portion of highway No. 10 in Montana. On the front side of the card is an index showing not only places through which one travelling this highway will pass, but also other information of value to the user of the device. The first item on the card designates the portion of the highway covered or displayed on the strip map illustrated on the back of the card. In the illustrated example the card shows the route from Butte to Billings, Mont.

Referring to FIGURE 5 the first and last vertical columns give the index number and preferably indicated in red. Column A in FIGURE 5 shows the total mileage from the place given in Column C to the destination of the chart. Next, Column B advises the highway number to be used to travel to and reach the desired destination.

Column C lists the towns and places as they appear on the highway listed in chronologic order between the starting point and the point of destination. The next Column D indicates the number of miles from the point mentioned in Column C to the next point on the map. This may be a town, city, highway junction or other place of interest which is designated in Column E. Finally, the next and last figure in Column F advises the number of miles of the location shown in Column C from the starting point. This information may all be obtained by ascertaining the index number from the present point of location by means of the bar 86 in FIGURE 6 and then by utilizing this index number moving the bar 84 in FIGURE 5 to it and reading the information across.

To illustrate, the index number 1 gives in Column A the number 238 which is the milage from Butte to Billings, Mont. Column B indicates the highway number as 10 which must be travelled when leaving Butte and Column C gives the name Butte, the town in which the driver is presently located. Column D lists as 23 the number of miles to the next town or point of interest. Under Column E is listed junction (10–41) the name of the next town or place of interest which is, in this case, the highway junction of highways 10 and 41. Finally Column F lists a zero which is the number of miles travelled from the starting point or the number of miles from Butte.

A traveller traversing the highway illustrated on this card places the indicator bar 86 on the front of the case so that the place shown in Column C is his present location and he is immediately advised by the information on the chart the number of miles to the destination, the highway number upon which he is travelling, the name of the town, or place of interest he is now in, the number of miles to the next town or place of interest, the number of miles he has travelled from his starting point on the chart, and finally, the index number to locate his exact position on the strip map. As he travels along the highway and as he approaches each place designated in Column E he moves the indicator bar down to the next line of figures and is immediately given his location and highway information from that point. Upon reaching the destination point on the map, another card may be utilized giving the same information for the next portion of the trip.

It is apparent from the above that the present invention provides a relatively simple, inexpensive map holder or indicator device for aiding the automotive traveller. The unit is completely transparent including the slides and indicator bars so that there is absolutely no significant obstruction of any of the indicia on either side of the card received in the transparent case. The device is of relatively rugged construction being made of rigid but preferably slightly flexible transparent plastic. Although the device has been described in conjunction with automotive maps, it is apparent that it can be used for a wide variety of purposes to locate indicia points on any map or layout and, for example, may be used in conjunction with a floor plan layout card to indicate the location of merchandise displayed in a store or may be used in conjunction with engineering drawings to locate an item of machinery.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An indicator device comprising a pair of rectangular rigid sheets of transparent plastic material joined along at least two opposite edges, said sheets being spaced to define an intermediate card receiving pocket, aligned notches in one edge of each of said sheets for inserting and removing a card in said pocket, a U-shaped slide moveable along each of said opposite edges, said slides each having spaced legs receiving therebetween the joined edges of said sheets, first and second indicating bars, one of said bars overlying one of said sheets and secured at each end to said slides, the other of said bars overlying the other of said sheets and also secured at its ends to said slides whereby said bars cooperate to retain said slides on the opposite edges of the said sheets, and a card received in said pocket, said card having a map on one side including place names and a tabulation on the other side including information pertaining to the place names on the map, said indicating bars being so located with respect to each other and to said card that when the bar overlying the map is adjacent to a particular place name, then the other bar is adjacent to the portion of the tabulation having the information pertinent to said particular place name.

2. An indicator device as set forth in claim 1 further including an outwardly extending finger tab on each of said slides to facilitate movement thereof along said opposite edges of said sheets.

3. An indicator device as set forth in claim 2 including a transverse rib between said sheets extending from one of said opposite sides to the other and dividing the card receiving pocket into two separated compartments.

4. An indicator device comprising a flat transparent plastic case member, a card removably received in said case member, said card having a map on one side thereof, visible through said case, said map including place names thereon, said card further including a tabulation of information pertaining to said place names on its other side, also visible through said case, a pair of slide members movable along opposite edges of said case, a pair of indicator bars movable over the outer surfaces of said case member and joined at their opposite ends to said slide members, and a pair of aligned access openings in the sides of the case member adjacent an open edge to facilitate insertion and removal of the card from the case, said indicator bars being so located with respect to each other and to said card that when the bar overlying the map is adjacent a particular place name, then the bar overlying the tabulation is adjacent the information pertaining to said particular place name.

5. An indicator device as set forth in claim 4 including means for separating the case into two separate compartments, one for receiving the map and tabulation bearing card and a second compartment for receiving an advertising card.

References Cited
UNITED STATES PATENTS

| | | | |
|---|---|---|---|
| 1,037,984 | 9/1912 | Reid | 283—35 |
| 1,089,741 | 3/1914 | Batterson | 283—35 |
| 1,276,657 | 8/1918 | Ibanez | 35—40 |
| 1,383,492 | 7/1921 | Seely | 235—89 |
| 1,425,244 | 8/1922 | Easton | 235/89 |
| 1,656,673 | 1/1928 | Haugen | 235—89 |
| 1,728,491 | 9/1929 | Janneson | 35—75 |
| 2,003,954 | 6/1935 | Cox | 129—20 X |
| 2,411,300 | 11/1946 | Southwell | 116—135 |
| 2,442,870 | 6/1948 | Flynn | 120—33 |
| 2,494,536 | 1/1950 | Atwood | 35—40 |
| 2,513,491 | 7/1950 | Killough | 235—89 |
| 2,629,184 | 2/1953 | Johnson | 116—135 |
| 2,741,572 | 4/1956 | Lennartz | 129—20 |
| 2,789,372 | 4/1957 | Ribak | 35—40 |
| 2,809,447 | 10/1957 | Amsterdam | 35—42 |
| 2,891,314 | 6/1959 | Haschek | 35—40 |
| 3,087,457 | 4/1963 | Prosen | 116—135 |

(Other references on following page)

FOREIGN PATENTS

| | | |
|---|---|---|
| 996,138 | 8/1951 | France. |
| 688,912 | 3/1953 | Great Britain. |
| 755,934 | 8/1956 | Great Britain. |
| 423,891 | 7/1947 | Italy. |
| 529,884 | 6/1957 | Italy. |
| 33,864 | 10/1934 | Netherlands. |

OTHER REFERENCES

Publication: Aviation, July 1946, page 74, copy available in Class 35, subclass 40, Group 470.

IBM-Technical Disclosure Bulletin, volume 6, No. 4, September 1963, page 87, copy in Group 470-35-75.

JEROME SCHNALL, *Primary Examiner.*

L. J. CAPOZI, *Examiner.*